United States Patent
Ahn et al.

(10) Patent No.: US 7,831,983 B2
(45) Date of Patent: Nov. 9, 2010

(54) OPTICAL DISK DEVICE WITH RELEASE

(75) Inventors: Cheol-woong Ahn, Seoul (KR);
Jae-hyun Yoon, Suwon-si (KR); Un-jin Choi, Suwon-si (KR); Jeong-hun Yeom, Seongnam-si (KR); Myong-chun Lee, Hwaseong-si (KR)

(73) Assignee: Toshiba Samsung Storage Technology, Suwon-si (KR)

( * ) Notice: Subject to any disclaimer, the term of this patent is extended or adjusted under 35 U.S.C. 154(b) by 910 days.

(21) Appl. No.: 11/705,447

(22) Filed: Feb. 13, 2007

(65) Prior Publication Data

US 2007/0192781 A1   Aug. 16, 2007

(30) Foreign Application Priority Data

Feb. 16, 2006   (KR)   .................... 10-2006-0015246

(51) Int. Cl.
G11B 17/04   (2006.01)
(52) U.S. Cl. .................................................. 720/623
(58) Field of Classification Search ................... 720/623
See application file for complete search history.

(56) References Cited

U.S. PATENT DOCUMENTS

| 6,275,459 | B1 | 8/2001 | Obata et al. | |
| 2007/0192776 | A1 * | 8/2007 | Ahn et al. | 720/623 |
| 2008/0148301 | A1 | 6/2008 | Masaoka et al. | |
| 2008/0180677 | A1 * | 7/2008 | Gordley | 356/437 |

FOREIGN PATENT DOCUMENTS

| CN | 1221181 A | 6/1999 |
| EP | 1821302 A2 * | 8/2007 |
| JP | 06-180918 | 6/1994 |
| JP | 06180918 | 6/1994 |
| JP | 08102120 | 4/1996 |
| JP | 2002-117604 | 4/2002 |
| JP | 2005-85451 | 3/2005 |
| JP | 2005-190554 | 7/2005 |
| JP | 2005-190555 | 7/2005 |
| JP | 2005-203033 | 7/2005 |
| KR | 1998-060680 | 11/1998 |
| KR | 10-2004-008361 | 1/2004 |
| KR | 10-2004-0086175 | 10/2004 |
| TW | 535969 | 6/2003 |
| WO | WO 2005/101401 | 10/2005 |

OTHER PUBLICATIONS

Taiwanese Preliminary Notice of first Office Action issued on Jun. 23, 2010, in corresponding Taiwanese Application No. 096106069 (4 pages)(English translation only).
Chinese Office Action issued on Jun. 23, 2010, in corresponding Chinese Application No. 200710170123.X.

* cited by examiner

Primary Examiner—Allen T Cao
(74) Attorney, Agent, or Firm—NSIP Law

(57) ABSTRACT

An optical disk device with release, with the optical disk device including a main unit which having an optical pickup unit to recording/reproducing data on/from an optical disk, wherein the main unit is lifted/lowered for coupling/uncoupling the optical disk on/from a turn-table, a main slider including a rack connected by a gear to a driving source and moving linearly to lift/lower the main unit, and a releasing unit, when a pin is inserted in the optical disk device, to disengage the gear from the rack and allow the main slider to move manually. Thus, the optical disk can be manually unloaded from the optical disk device.

14 Claims, 8 Drawing Sheets

OPTICAL DISK DEVICE WITH RELEASE

CROSS-REFERENCE TO RELATED APPLICATIONS

This application claims the benefit of Korean Patent Application No. 10-2006-0015246, filed on Feb. 16, 2006 in the Korean Intellectual Property Office, the disclosure of which is incorporated herein in its entirety by reference.

BACKGROUND OF THE INVENTION

1. Field of the Invention

One or more embodiments of the present invention relate to an optical disk device, and more particularly, to a slot-in type optical disk device which can be operated manually to load/unload an optical disk.

2. Description of the Related Art

Various information storage media such as optical disks that are inexpensive and have large information storage capacity are nowadays widely used. Optical disks are generally classified into compact disks (CD) and digital versatile disks (DVD) according to the information storage capacity. Examples of such optical disks are 650 MB CD-R, CD-RW, 4.7 GB DVD-R, DVD+R, DVD-RW, DVD+RW, and the like. In addition, HD-DVD and blue ray disk having recording capacity of 200 GB or greater have been developed.

Conventional optical disk devices, having a cassette or tray for accommodating an optical disk, have been used for mobile/portable electronic devices such as laptops or camcorders. However, there are several problems with such conventional devices. That is, conventional optical disk devices are generally larger in size and thus are difficult to carry. In addition, insertion or ejection of an optical disk in such an environment is inconvenient. Thus, a slot-in type optical disk device having a slim slot, with a width corresponding to that of an optical disk, through which an optical disk can be easily inserted or ejected, is typically more preferable than the conventional optical disk device.

In this case, however, it has been found desirable that the optical disk be manually ejected when the optical disk device has a defect, the operation system of the laptop using the optical disk device malfunctions, or the battery of the laptop completely runs out. Thus, to achieve this herein identified need, a slot-in type optical disk device particularly needs a structure to manually eject an optical disk. However, up to now, the structure to eject an optical disk manually has not been provided for such a slot-in type optical disk device.

SUMMARY OF THE INVENTION

One or more embodiments of the present invention provide a slot-in type optical disk device with ejection capabilities that can be used to manually eject an optical disk.

Additional aspects and/or advantages of the invention will be set forth in part in the description which follows and, in part, will be apparent from the description, or may be learned by practice of the invention.

To achieve the above and/or other aspects and advantage, embodiments of the present invention include an optical device, including a main support unit to lift and/or lower to respectively couple and/or uncouple, e.g., chuck or unchuck, an optical medium on/from a turn-table, a slider to lift/lower the main unit, and a releasing unit to disengage portions of the slider from a driving source which drives the slider to manually move the slider upon insertion of a pin into the optical device.

The main support unit may include an optical pickup unit for recording/reproducing data on/from the optical medium.

In addition, the slider may include a rack connected by a gear to a driving source to linearly move the main unit.

The releasing unit may disengage the gear from the rack for permitting the manual movement of the slider upon the insertion of the pin into the optical device.

The releasing unit may further include a releasing lever including an inclined surface and a gear moving unit, the inclined surface and the gear moving unit being positioned in respective opposite directions with respect to a hinge, wherein when the pin is inserted in the optical device and presses against the inclined surface, the releasing lever is rotated around the hinge, such that the gear moving unit disengages the gear from the rack.

Further, the releasing unit may include an elastic member applying an elastic force to the gear, such that when the pin is removed from the optical device, the releasing lever and the gear are elastically forced to return to an original position by the elastic force of the elastic member.

In addition, an edge of the gear may be chamfered.

Still further, the optical device may include a slot, and a lever unit to guide the optical medium through the slot to insert the optical medium into the optical device such that the optical medium is concentric with the turn-table and to unload the optical medium in a direction opposite to the loading direction, wherein, when the pin is inserted into the optical device, the rack is correspondingly forced to disengage from the gear, such that the slider is thereby caused to move by the insertion movement of the pin, and the optical medium is correspondingly caused to uncouple from the turntable and unload from the optical device through the slot.

The optical medium may be a disk.

To achieve the above and/or other aspects and advantage, embodiments of the present invention include an optical medium releasing method, including lifting and/or lowering to respectively couple and/or uncouple an optical medium on/from a turn-table upon respective loading or unloading of the optical medium from a optical device, and selectively engaging portions of a slider of the optical device to manually move the slider upon insertion and removal of a pin into and out of the optical device.

The method may further include recording and/or reproducing data from the optical medium while coupled within the optical device.

To achieve the above and/or other aspects and advantage, embodiments of the present invention include an optical medium releasing method, including lifting and/or lowering to respectively couple and/or uncouple an optical medium on/from a turn-table upon respective loading or unloading of the optical medium from a optical device, inserting a pin into the optical device, and disengaging portions of a slider of the optical device to manually move the slider upon the insertion of the pin into the optical device.

To achieve the above and/or other aspects and advantage, embodiments of the present invention include an optical medium releasing method, including positioning a main support unit for lifting and/or lowering to respectively couple and/or uncouple an optical medium on/from a turn-table, positioning a slider for lifting/lowering the main unit, and positioning a releasing unit for disengaging portions of the slider from a driving source which drives slider to manually move the slider upon insertion of a pin into the optical device.

To achieve the above and/or other aspects and advantage, embodiments of the present invention include a slot-in type optical device framing, including a slot entrance for insertion of an optical medium from outside to inside the framing, and a pin entrance on an outer surface of the framing, with the framing enclosing a main support unit to lift and/or lower to respectively couple and/or uncouple the inserted optical medium on/from a turn-table for recording and/or reproducing data from the optical medium, a slider to lift/lower the main unit, and a releasing unit to disengage portions of the slider from a driving source which drives the slider to manually move the slider upon insertion of a pin into the optical device, such that the pin entrance is aligned with the releasing unit for the disengaging of the portions of the slider from the driving source upon the insertion of the pin through the pin entrance.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
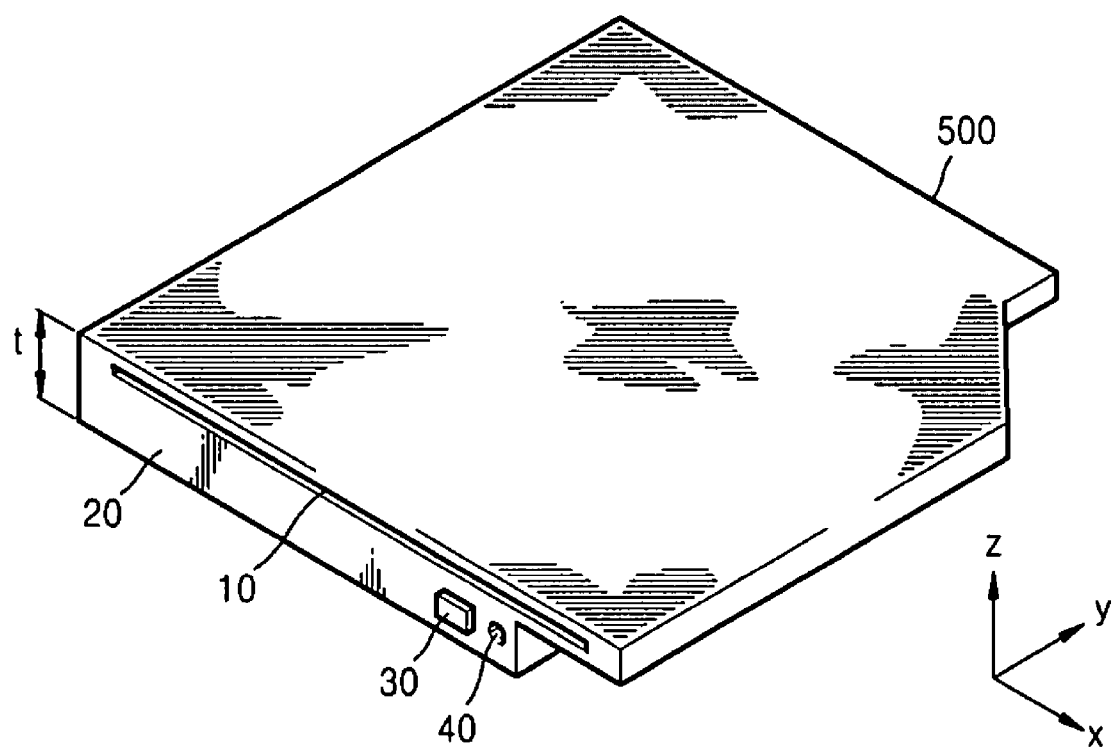
FIG. 1 illustrates an optical disk device, according to an embodiment of the present invention.

Reference will now be made in detail to embodiments of the present invention, examples of which are illustrated in the accompanying drawings, wherein like reference numerals refer to the like elements throughout. Embodiments are described below to explain the present invention by referring to the figures.

FIG. 1 illustrates an optical disk device, according to an embodiment of the present invention. The optical disk device may include a frame 500 having a front surface 20 including, for example, a slot-in type slot 10 for loading/unloading an optical disk and an ejection button 30 for unloading an optical disk loaded in the optical disk device. According to an embodiment of the present invention when power is turned off after an optical disk was loaded in the optical disk device, a pin may be inserted into the illustrated ejection hole 40 to move a main slider, for example, to unload the optical disk. The optical disk device, according to this embodiment, may be used in conjunction with a large-diameter disk (DL), e.g., having a diameter of approximately 12 cm, and/or a small-diameter disk (DS), e.g., having a diameter of approximately 8 cm. Due to the trend of higher density disks, the DS disk is being increasingly used. In addition, as the standard size of the disk routinely varies, the diameter of the DL and the DS varies as well. Further, optical disk devices mounted in portable information devices, such as in a laptop computer, may be of a slim type, and thus the whole thickness may be limited within a predetermined allowable range. Here, the allowable range is currently 12.7 mm but may vary depending on the changes in the standard sizes of the optical disk device. As shown in below figures, and according an embodiment of the present invention, a lever unit and a driving unit may accommodated in the frame 500.

Figure 2:
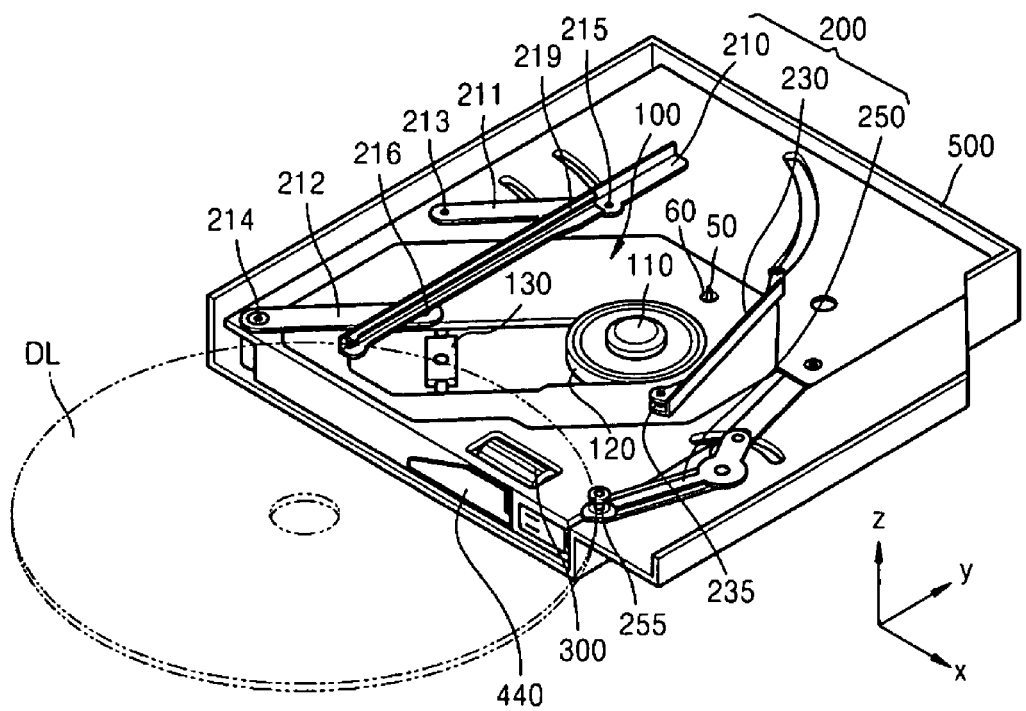
FIG. 2 illustrates an optical disk device, such as that of FIG. 1, showing a large-diameter disk (DL) pushing a guide lever and a loading lever, according to an embodiment of the present invention.

FIG. 2 illustrates an optical disk device, such as that of FIG. 1, showing a large-diameter disk (DL) starting to push a guide lever and a loading lever, according to an embodiment of the present invention. When the DL disk is inserted in the optical disk device, the DL disk starts pressing a guide lever 210 and a loading lever 250, for example. Referring to the embodiment of FIG. 2, the optical disk device may further include a main unit 100 and a lever unit 200.

The main unit 100 may include a turn-table 110 for accommodating the DL disk, a spindle motor 120 for rotating the turn-table 110, an optical pickup 130 for radiating light to/from the DL disk to record and/or reproduce data, and a feeding motor (not shown) for moving the optical pickup 130 in a tracking direction of the DL disk.

Figure 7:
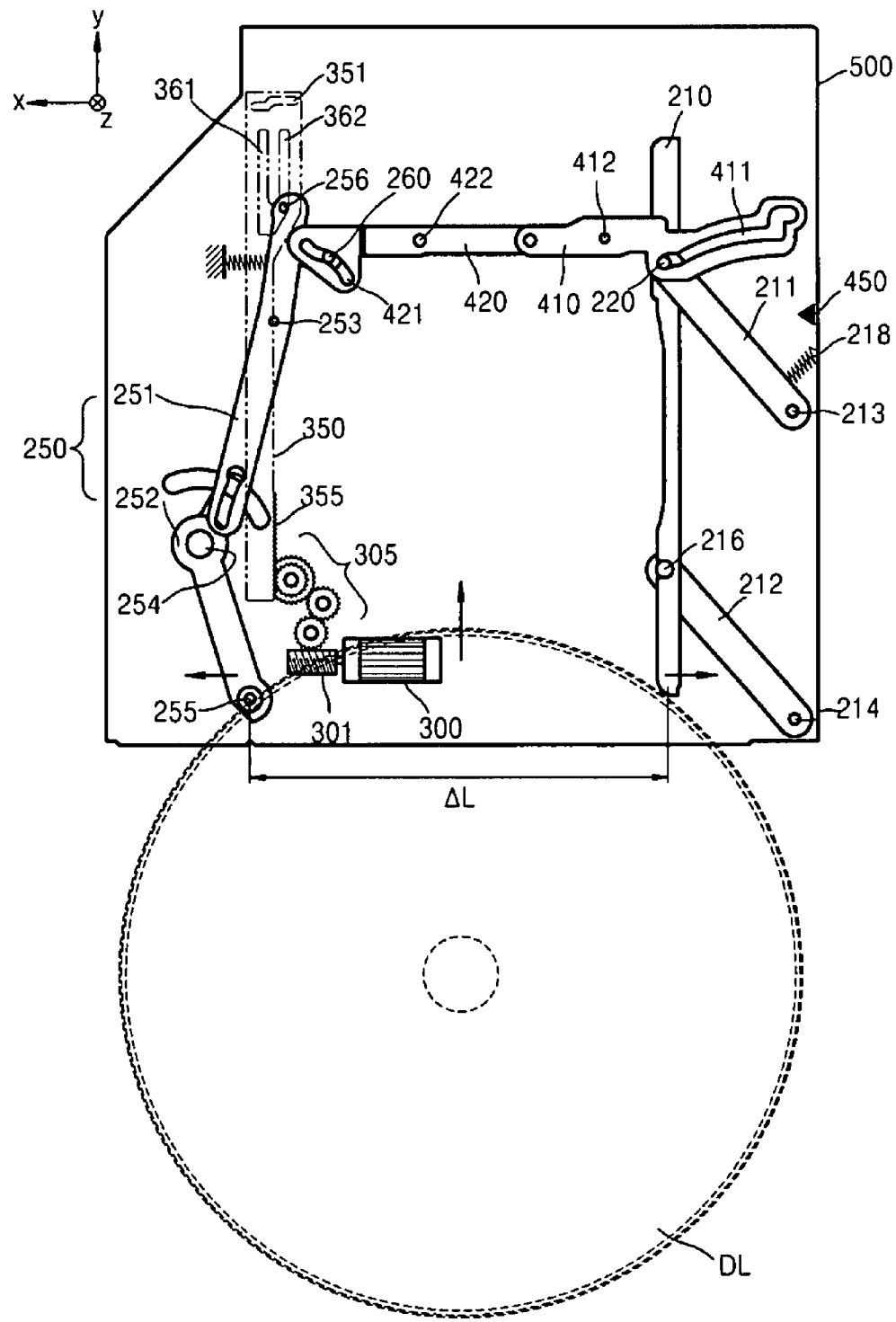
FIG. 7 illustrates an optical disk device, such as that of FIG. 2, showing a locking unit and a lever unit being in a locking state, according to an embodiment of the present invention.

The lever unit 200 may guide the DL disk inserted through the slot 10 to couple the DL disk in a concentric position on the turn-table 110. When the DL disk is to be unloaded from the optical disk device, the lever unit 200 may uncouple the DL disk and guide the DL disk in the opposite direction to the loading direction. The driving unit may include a main slider 350, such as shown in FIG. 7, connected to a driving source 300, and drive the lever unit 200 to load/unload the DL disk and lift/lower the main unit 100 to couple/uncouple the DL disk on the turn-table 110.

The lever unit 200 may include an ejection lever 230, a guide lever 210, and a loading lever 250, for example. In this embodiment, the ejection lever 230 applies an elastic force to the DL disk in the unloading direction (negative direction of y-axis) to unload the DL disk. The guide unit 210 can have a disk guiding surface 219 extending parallel to the loading direction (positive direction of y-axis) of the DL disk. The guide lever 210 may be part of a 4-bar link structure and operated in a parallel plane to the loading/unloading direction of the DL disk, for example, in order to provide stable loading/unloading performance of the DL disk. Here, the 4-bar link structure may include the guide lever 210, a first subsidiary link 211, and a second subsidiary link 212, forming a parallelogram, for example. An end of the first subsidiary link 211 may be pivotally coupled to a first subsidiary link hinge 213 mounted in the optical disk device, and another end of the first subsidiary link 211 may be pivotally coupled to a hinge 215 mounted in the guide lever 210. Similarly, an end of the second subsidiary link 212 may be pivotally coupled to a second subsidiary link hinge 214 mounted in the guide lever 210, and another end of the second subsidiary link 212 may be pivotally coupled to a second guide lever hinge 216 mounted in the guide lever 210. In an embodiment, the first subsidiary link 211 and the second subsidiary link 211 may preferably have the same length, for example. One end of the loading lever 250, e.g., having a disk contact portion 255, may be placed near the slot 10 such that the loading lever 250 guides the DL disk in the slot 10. The guide lever 210 and the loading lever 250 may be operated by a plurality of cams and may be elastically biased in a predetermined direction for exact controlling of the position of the DL disk. According to an embodiment of the present invention, a guide lever spring 218, as shown in FIG. 7, may apply an elastic force to the first subsidiary link 211 so that the guide lever 210 is elastically biased to contact the DL disk.

Figure 3:
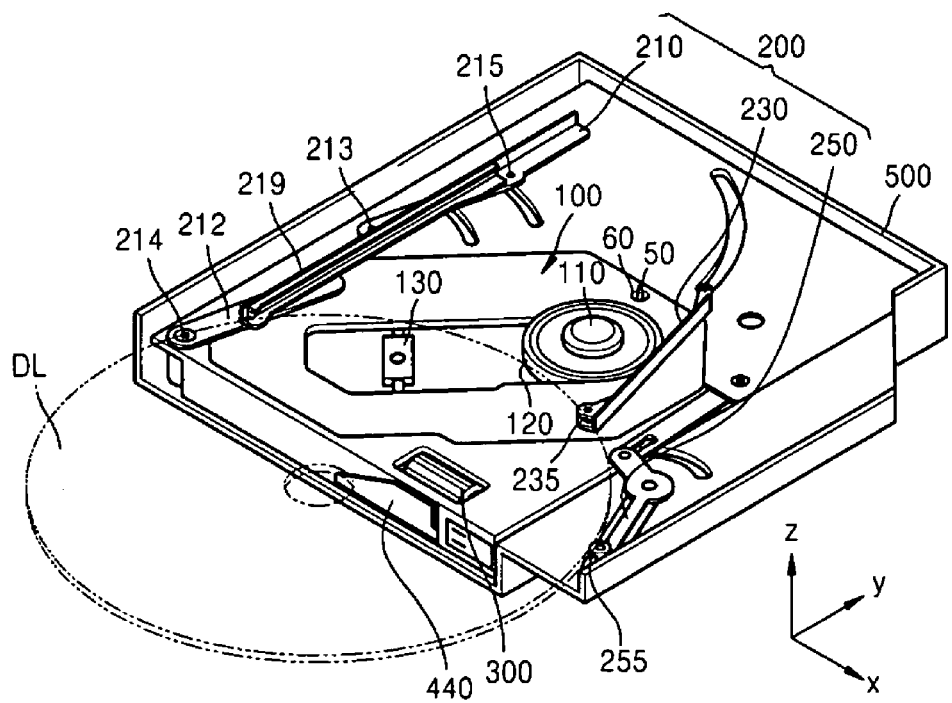
FIG. 3 illustrates an optical disk device, such as that of FIG. 2, showing a large-diameter disk starting to contact an ejection lever, according to an embodiment of the present invention.

FIG. 3 illustrates an optical disk device, such as that of FIG. 2, showing a large-diameter disk starting to contact an ejection lever, according to an embodiment of the present invention. When the DL disk is inserted into the slot 10, the guide lever 210 and the loading lever 250 may guide the DL disk in the optical disk device, such that the DL disk contacts the ejection lever 230. Here, the ejection lever 230 may include a disk contact portion 235 for guiding the disk, for example.

Figure 4:
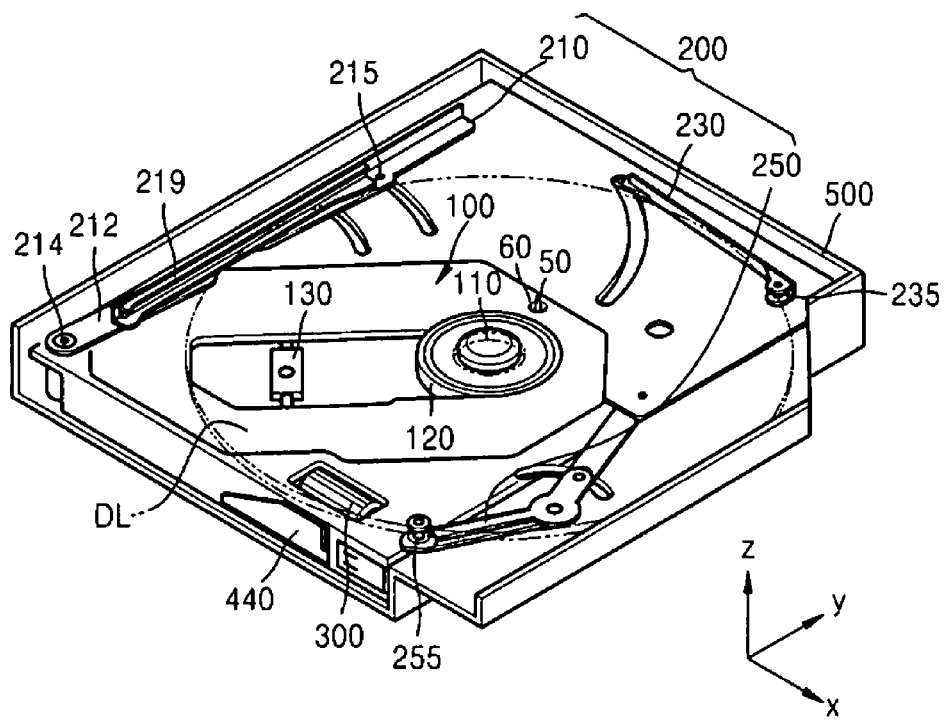
FIG. 4 illustrates an optical disk device, such as that of FIG. 3, showing a large-diameter disk completely loaded but not yet coupled on a turn-table, according to an embodiment of the present invention.
Figure 5:
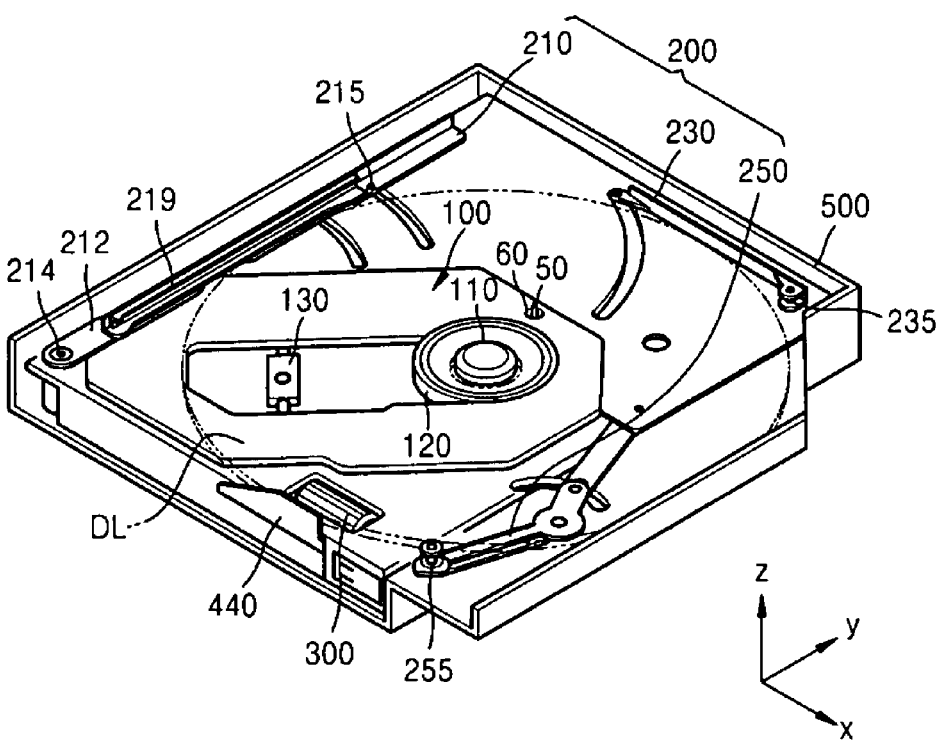
FIG. 5 illustrates an optical disk device, such as that of FIG. 4, showing a large-diameter disk coupled on a turn-table and a lever unit being disengaged.

FIG. 4 illustrates an optical disk device, such as that of FIG. 3, showing a large-diameter disk completely loaded but not yet coupled on a turn-table 110, according to an embodiment of the present invention. When the DL disk is concentric with the turn-table 110, the driving unit, for example, may lift the main unit 100 to couple the DL disk onto the turn-table 110. FIG. 5 illustrates an optical disk device, such as that of FIG. 4, showing a DL disk being coupled on the turn-table 110, with a lever unit 200 not being in contact with the DL disk. When the DL disk is coupled on the turn-table 110, the lever unit 200 does not anymore contact the outer circumference of the DL disk. In other words, when the coupling of the optical disk is completed, the lever unit 200 may be disengaged from the outer circumference of the optical disk for rotation of the optical disk. Here, the driving unit can disengage the lever unit 200 from a side of the optical disk, for example.

Figure 6:
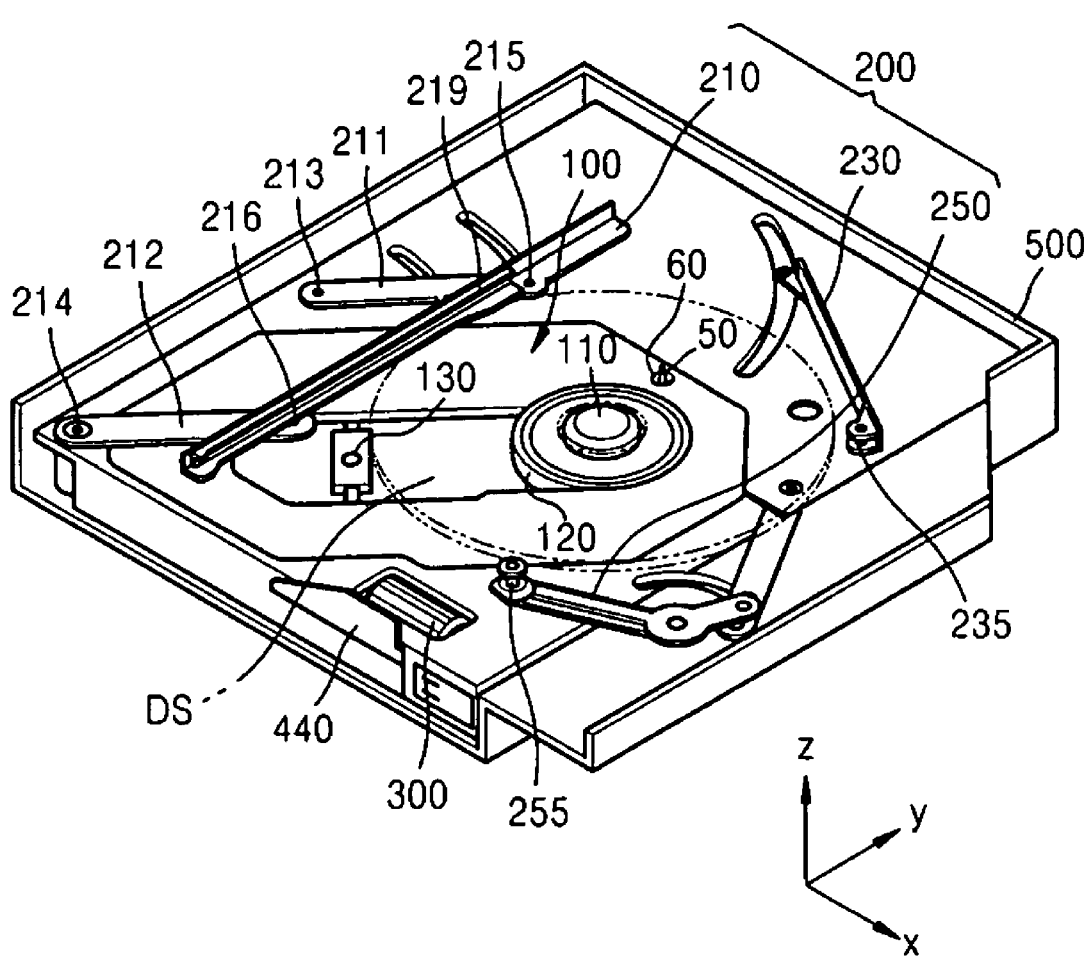
FIG. 6 illustrates an optical disk device, such as that of FIG. 1, showing a small-diameter disk (DS) coupled on a turn-table and a lever unit being disengaged.

FIG. 6 illustrates an optical disk device, such as that of FIG. 1, showing a small-diameter disk (DS) coupled on the turn-table 110, with the lever unit 200 not being in contact with the DS disk. The lever unit 200 may be operated to have different trajectories according to the diameter of the optical disk. Comparing FIGS. 6 and 5, in the case of a DS disk, the guide lever 210 may maintain a locking state in standby mode and in a loading state, and may escape from the side of the disk when coupling is completed. Here, in this embodiment, the amount of rotation of the loading lever 250 is larger in the case of the DS disk and the amount of rotation of the ejection lever 230 is smaller in the case of the DS disk.

Referring to FIGS. 5 and 6, a shutter 440 may be lifted to block the slot 10 after the DL or DS disks are completely loaded in the slot 10 to prevent another optical disk from being loaded in the optical disk device. Here, the shutter 440 may be lifted to block the slot 10 as the DL or DS disk is being loaded, and lowered to open the slot 10 as the DL or DS disk is unloaded. In an embodiment, the shutter 440 may be operated by a main slider 350, such as shown in FIG. 7.

FIG. 7 illustrates an optical disk device showing a locking unit and the lever unit 200 being in a locking state, according to an embodiment of the present invention. The locking unit may lock the guide lever 210 and the loading lever 250 in a standby mode, for example, and unlock the guide lever 210 and the loading lever 250 when the DL is inserted into the slot 10, e.g., by hand. The distance between the guide lever 210 and the loading lever 250 may be equal to or larger than the diameter of the DS disk and smaller than the diameter of the DL disk, for example. In one embodiment, the main slider 350 may be connected to a driving source 300 via a worm gear 301, a gear train 305, and a rack 355 to be moved in a straight line to operate the lever unit 200. The main slider 350 may include a first loading cam 361 and a second loading cam 362. Here, the first loading cam 361 may operate the loading lever 250 to move the DL disk, and the second loading cam 362 may operate the loading lever 250 to move the DS disk. When the DL or DS disks are inserted through the slot 10 in a standby mode, one of the first and second loading cams 361 and 362 may be selected by the difference of the amount of movement of the loading lever 250, which is pushed by the DL or DS disk. A loading cam boss 256 may be connected to one of the first and second loading cams 361 and 362, depending on the diameter of the optical disk pushing the loading lever 250. The loading lever 250 may include a first loading lever 251 and a second loading lever 252, such that an end portion of the first loading lever 251 is connected to the main slider 350 by the loading cam boss 256 and rotated around a first loading joint 253. The second loading lever 252 may, thus, be rotated around a second loading lever hinge 254 and an end portion of the second loading lever 252 pivotally coupled to the first loading lever 251, with another end portion including the disk contact portion 255.

The locking unit may include a first subsidiary link 410 and a second subsidiary link 420, with the first subsidiary link 410 including a first cam 411 and rotated around a first lever 412 by the movement of the first cam 411 connected to a first boss 220 formed on the guide lever 210. The second subsidiary link 420 may include a second cam 421 to be rotated around a second hinge 422 by the movement of the second cam 421. Here, the second cam 421 is connected to a second boss 260 formed on the loading lever 250. The first and second subsidiary links 410 and 420 are pivotally coupled to each other around the first and second hinges 412 and 422 at the opposite side to the first and second cams 411 and 421. In an embodiment, the switch 450 may be turned on/off by the operation of the guide lever 210 and sense the diameter of the optical disk. The cam 351 may further operate a sub-slider (not shown) and disengage the guide lever 210 and the ejection lever 120, e.g., from the side of the optical disk, when coupling of the optical disk on the turn-table 110 is completed.

Figure 8:
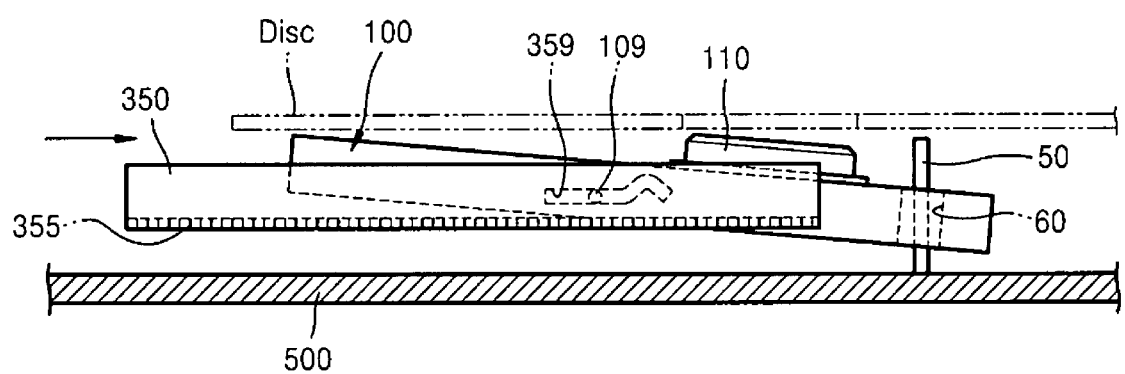
FIG. 8 illustrates an optical disk device showing the optical disk being uncoupled when a main unit is lowered, according to an embodiment of the present invention.

FIG. 8 illustrates an optical disk device being uncoupled when the main unit 100 is lowered, according to an embodiment of the present invention. In an embodiment, the frame 500 may include a rod 50 for uncoupling the optical disk from the turn-table 110. Here, a hole 60 protruding the rod 50 toward the optical disk when the optical disk is uncoupled may be formed in the main unit 100. As illustrated in FIG. 8, a main unit boss 109 can be formed at a side of the main unit 100, and a main unit cam 359, which is connected to the main unit boss 109, may be formed at a side of the main slider 350. Accordingly, the main slider 350 can be moved in a straight line and lift or lower the main unit 100. When the main unit 100 is lowered, the rod 50 may, thus, protrude from the hole 60 and push the optical disk upward. As described above, the main slider 350, according to an embodiment, may lift or lower the main unit 100 to uncouple the optical disk; particularly, in such a slot-in type optical disk device, the optical disk can be unloaded by moving the lever unit 200.

Figure 9:
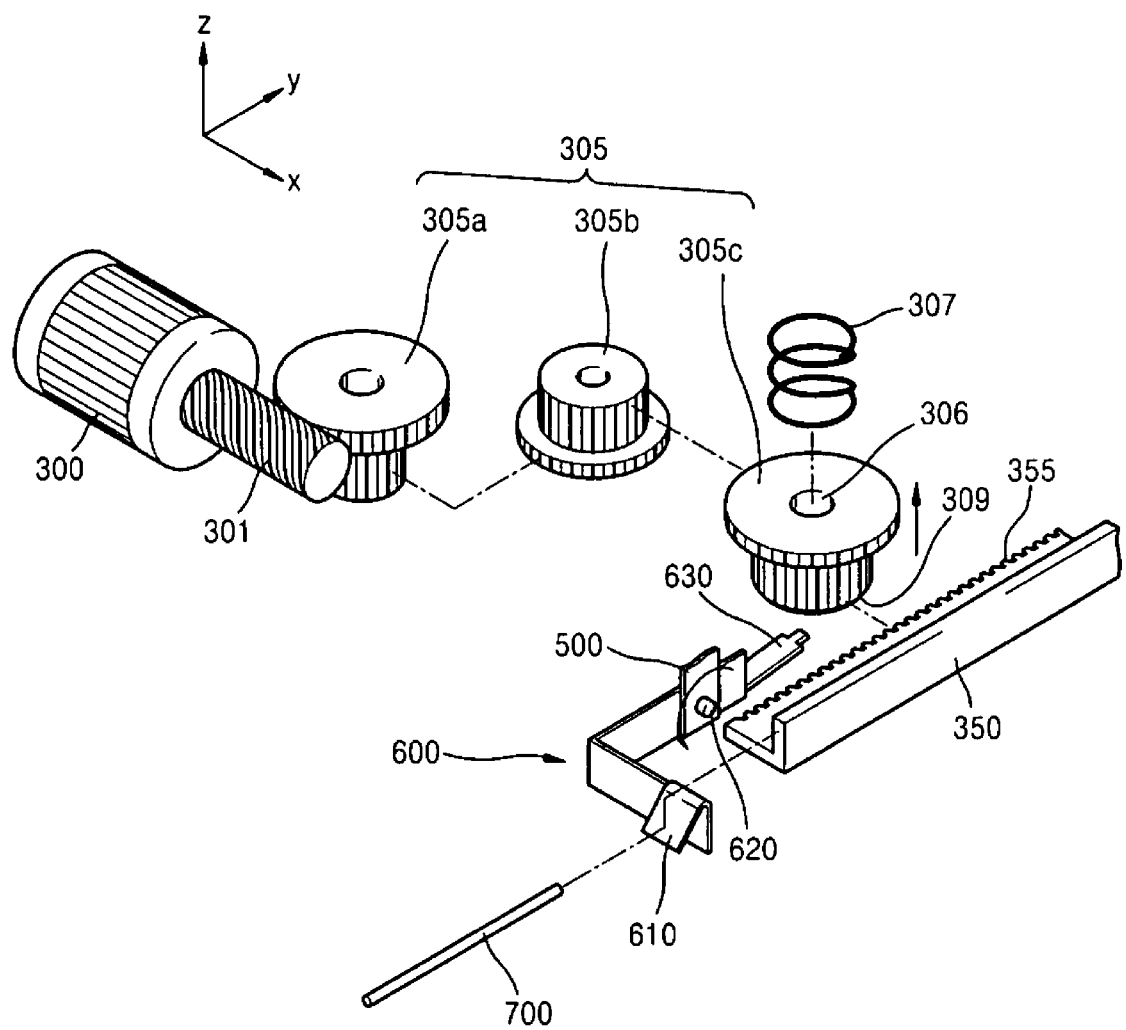
FIG. 9 illustrates a releasing unit in an optical disk device, according to an embodiment of the present invention.

FIG. 9 illustrates a releasing unit in an optical disk device, according to an embodiment of the present invention.

Figure 10:
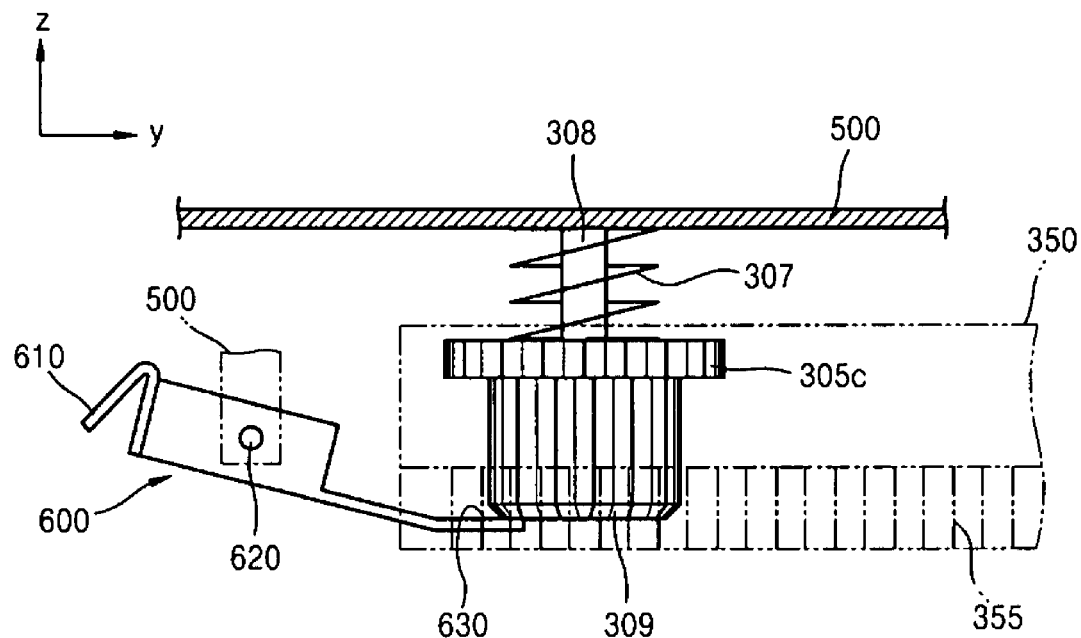
FIG. 10 illustrates a releasing unit showing a releasing lever in a position before a pin is inserted into the optical disc device, according to an embodiment of the present invention.

FIG. 10 illustrates a releasing unit having a releasing lever in a position before a pin 700 is inserted into the optical disc device, according to an embodiment of the present invention.

Figure 11:
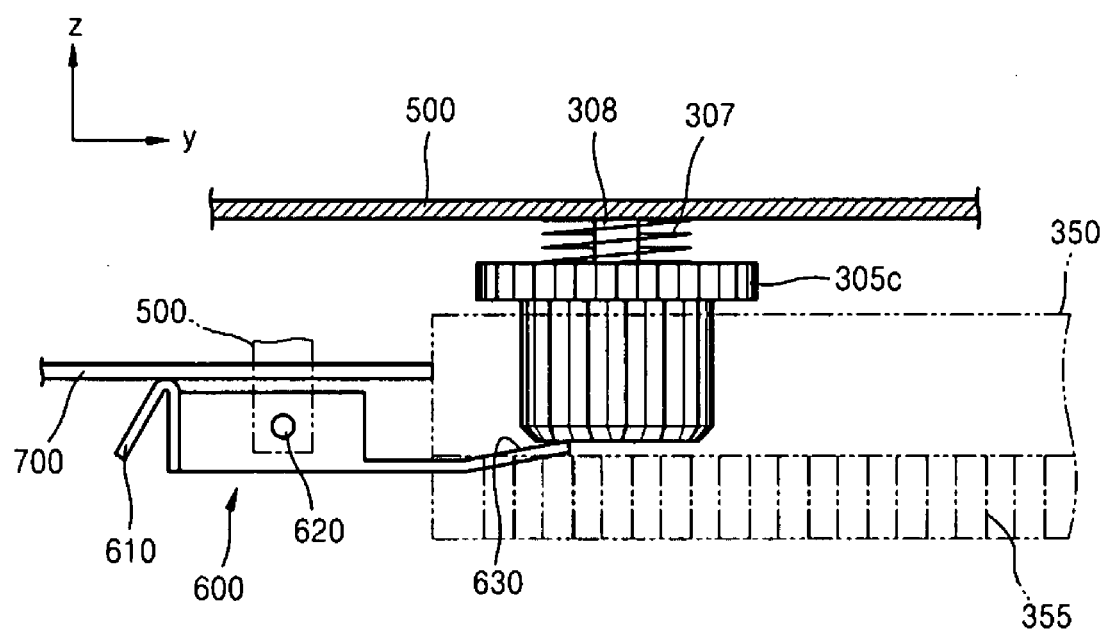
FIG. 11 illustrates a releasing unit showing a release state where a gear and a rack are disengaged by the insertion of a pin, according to an embodiment of the present invention.

FIG. 11 illustrates a releasing unit in a release state where a gear and a rack 355 are disengaged by the insertion of the pin 700, according to an embodiment of the present invention.

Referring to FIGS. 9 through 11, the releasing unit may include a releasing lever 600, such that the releasing lever 600 moves the main slider 350 to uncouple the gear from the rack 355 when the pin 700 is inserted in the aforementioned ejection hole 40. The driving source 300 may be connected to the rack 355 via the worm gear 301 and the gear train 305, with the gear train 305 including a first gear 305a meshed with the worm gear 301, a third gear 305c meshed with the rack 355, and a second gear 305b meshed with the first gear 305a and the third gear 305c. In an embodiment, the gear that is meshed with the rack 355 and is disengaged therefrom by the releasing unit may be any one of the first gear 305a, the second gear 305b, and the third gear 305c included in the gear train 305. In addition, the gear train 305 may include more or less gears. Thus, in one embodiment, the third gear 305c is meshed with and disengaged from the rack 355.

In an embodiment, a gear bearing 306 may be provided inside the third gear 305c and inserted into a gear boss 308 formed in the frame 500 of the optical disk device. An elastic member 307 may further be interposed between the frame 500 and the third gear 305c and apply an elastic force to the third gear 305c to be meshed with the rack 355. Here, in this illustrated embodiment, the releasing lever 600 has an inclined surface 610 at one end and a gear moving portion 630 at other side of a hinge 620. When the inclined surface 610 is pressed by the pin 700 inserted through the ejection hole 40, the releasing lever 600 can be rotated around the hinge 620 and the gear moving portion 630 may, thus, disengage the third gear 305c from the rack 355. When the pin 700 is removed, the releasing lever 600 and the third gear 305c may be returned by the elastic force of the elastic member 307 to the original position before the pin 700 was inserted. An edge 309 of the third gear 305c may be chamfered so that the third gear 305c and the rack 355 are easily meshed with each other.

As described above, in an embodiment of the present invention, a slot-in type optical disk device may include a releasing unit that disengages the rack 355 from a gear when the main slider 350 is pushed by the pin 700 inserted in ejection hole 40. Thus, the DL or DS disk can be uncoupled from the turn-table 110 and unloaded from such a slot-in type optical disk device.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical device, comprising:
 a main support unit to lift and/or lower to respectively couple and/or uncouple an optical medium on/from a turn-table;
 a slider to lift/lower the main unit; and
 a releasing unit to disengage portions of the slider from a driving source which drives the slider to manually move the slider upon insertion of a pin into the optical device.

2. The optical device of claim 1, wherein the main support unit comprises an optical pickup unit for recording/reproducing data on/from the optical medium.

3. The optical device of claim 1, wherein the slider comprises a rack connected by a gear to a driving source to linearly move the main unit.

4. The optical device of claim 3, wherein the releasing unit disengages the gear from the rack for permitting the manual movement of the slider upon the insertion of the pin into the optical device.

5. The optical device of claim 4, wherein the releasing unit comprises a releasing lever comprising an inclined surface and a gear moving unit, the inclined surface and the gear moving unit being positioned in respective opposite directions with respect to a hinge,
 wherein when the pin is inserted in the optical device and presses against the inclined surface, the releasing lever is rotated around the hinge, such that the gear moving unit disengages the gear from the rack.

6. The optical device of claim 5, wherein the releasing unit further comprises an elastic member applying an elastic force to the gear, such that when the pin is removed from the optical device, the releasing lever and the gear are elastically forced to return to an original position by the elastic force of the elastic member.

7. The optical device of claim 6, wherein an edge of the gear is chamfered.

8. The optical device of claim 1, further comprising:
 a slot; and
 a lever unit to guide the optical medium through the slot to insert the optical medium into the optical device such that the optical medium is concentric with the turn-table and to unload the optical medium in a direction opposite to the loading direction,
 wherein, when the pin is inserted into the optical device, the rack is correspondingly forced to disengage from the gear, such that the slider is thereby caused to move by the insertion movement of the pin, and the optical medium is correspondingly caused to uncouple from the turn-table and unload from the optical device through the slot.

9. The optical device of claim 1, wherein the optical medium is a disk.

10. An optical medium releasing method, comprising:
 lifting and/or lowering to respectively couple and/or uncouple an optical medium on/from a turn-table upon respective loading or unloading of the optical medium from a optical device; and
 selectively engaging portions of a slider of the optical device to manually move the slider upon insertion and removal of a pin into and out of the optical device.

11. The optical medium releasing method of claim 10, further comprising recording and/or reproducing data from the optical medium while coupled within the optical device.

12. An optical medium releasing method, comprising:
 lifting and/or lowering to respectively couple and/or uncouple an optical medium on/from a turn-table upon respective loading or unloading of the optical medium from a optical device;
 inserting a pin into the optical device; and
 disengaging portions of a slider of the optical device to manually move the slider upon the insertion of the pin into the optical device.

13. An optical medium releasing method, comprising:
 positioning a main support unit for lifting and/or lowering to respectively couple and/or uncouple an optical medium on/from a turn-table;
 positioning a slider for lifting/lowering the main unit; and
 positioning a releasing unit for disengaging portions of the slider from a driving source which drives the slider to manually move the slider upon insertion of a pin into the optical device.

14. A slot-in type optical device framing, comprising:
- a slot entrance for insertion of an optical medium from outside to inside the framing; and
- a pin entrance on an outer surface of the framing, with the framing enclosing a main support unit to lift and/or lower to respectively couple and/or uncouple the inserted optical medium on/from a turn-table for recording and/or reproducing data from the optical medium, a slider to lift/lower the main unit, and a releasing unit to disengage portions of the slider from a driving source which drives the slider to manually move the slider upon insertion of a pin into the optical device, such that the pin entrance is aligned with the releasing unit for the disengaging of the portions of the slider from the driving source upon the insertion of the pin through the pin entrance.

* * * * *